United States Patent [19]
Maggioni et al.

[11] Patent Number: 4,964,612
[45] Date of Patent: Oct. 23, 1990

[54] ELECTROMAGNETICALLY-OPERATED ROTARY SERVOVALVE

[75] Inventors: Virginio Maggioni, Rosta; Vittorino Torrielli, Turin, both of Italy

[73] Assignee: Fiat Auto S.p.A., Turin, Italy

[21] Appl. No.: 348,360

[22] Filed: May 8, 1989

[30] Foreign Application Priority Data

May 10, 1988 [IT] Italy .............................. 53128/88[U]

[51] Int. Cl.⁵ ............................................. F16K 31/10
[52] U.S. Cl. .............................. 251/129.09; 251/129.2; 137/625.47
[58] Field of Search ....................... 251/129.2, 129.09; 137/625.47

[56] References Cited

U.S. PATENT DOCUMENTS

| | | | |
|---|---|---|---|
| 467,153 | 1/1892 | Chatard | 251/129.09 X |
| 1,056,124 | 3/1913 | Rorke | 251/129.09 |

FOREIGN PATENT DOCUMENTS 1142581 4/1957 France .............................. 251/129.2

Primary Examiner—Arnold Rosenthal
Attorney, Agent, or Firm—Shlesinger & Myers

[57] ABSTRACT

An electromagnetically operated rotary servovalve particularly suitable for controlling hydraulic actuators, for example forming part of vehicle suspensions is described; the servovalve comprises a valve body provided with at least one series of respective radial ducts disposed angularly spaced apart, a rotary distributor of cock type which depending on its angular position either blocks said radial ducts or selectively connects them together in pairs, a pair of linear electromagnetic actuators, and transmission means mechanically connecting said electromagnetic actuators to said rotary distributor and arranged to convert with a predetermined step-up ratio the linear motion of said actuators into rotary motion of said distributor.

7 Claims, 2 Drawing Sheets

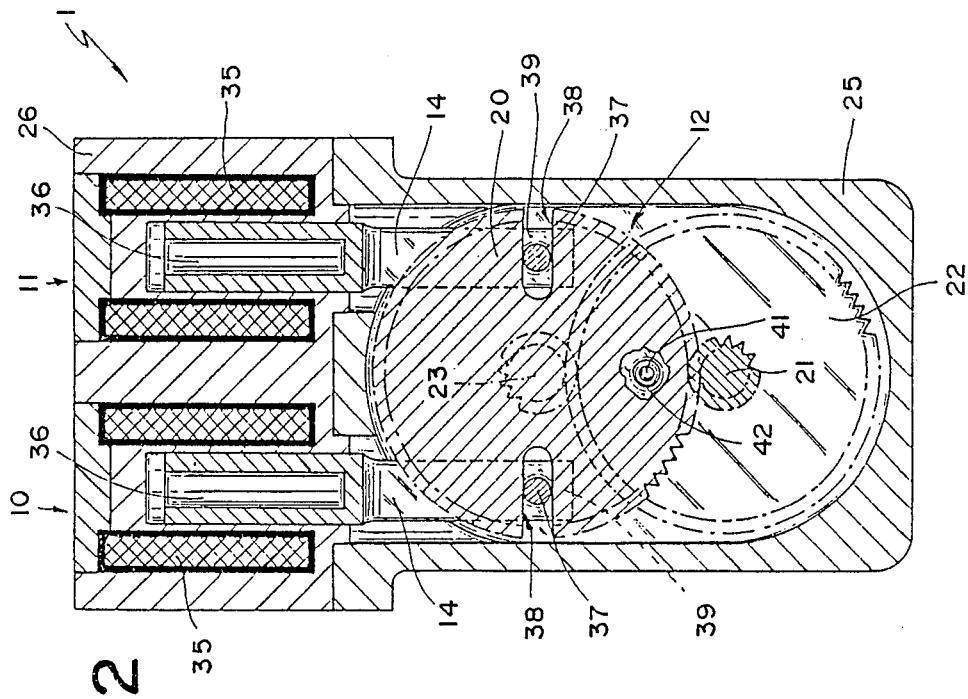

ELECTROMAGNETICALLY-OPERATED ROTARY SERVOVALVE

BACKGROUND OF THE INVENTION

This invention relates to an electromagnetically operated rotary servovalve, particularly suitable for operating hydraulic actuators, such as the actuators which control the hydraulic active suspensions of a vehicle.

For the running safety of a vehicle it is known to be important to be able to rapidly adapt the geometrical, elastic and damping characteristics of vehicle suspensions to the particular road situation in which the vehicle finds itself at any given time. For this purpose, active suspensions have been designed incorporating hydraulic actuators. By controlling the feed flow to such actuators using suitable electromagnetically operated servovalves controlled by appropriate central electronic units, the suspension characteristics, such as the rigidity, amplitude, height of the vehicle from the roadway etc. can be influenced. Currently used servovalves, whether offering discrete or on-off flow control or whether operating on a continuous control basis, are all of the sliding spool type. The spool position controls the feed flow to the actuators and is regulated either by a hydraulic low-pressure secondary control circuit controlled by a device of blade/nozzle type itself controlled by electromagnets, or directly by linear electromagnetic actuators which attract the opposing ends of the spool. Directly controlled servovalves absorb a large quantity of electric current in operating the electromagnetic actuators, are bulky and in particular have an unsatisfactory response speed, so making it impossible to adapt the suspension characteristics to the vehicle running situation in useful time. Indirectly controlled magneto-hydraulic servovalves are rapid and accurate but are also bulky, are of generally complicated construction and are of high cost.

SUMMARY OF THE INVENTION

The object of the invention is to provide an electromagnetically operated servovalve, particularly suitable for continuously controlling actuators for operating hydraulic active vehicle suspensions, which is free of the aforesaid drawbacks, and in particular having a minimum response time, low electricity consumption, considerable constructional simplicity, low cost and small overall size.

Said object is attained according to the invention by an electromagnetically operated servovalve in particular for controlling an actuator in an active vehicle suspension, characterized by comprising in combination:
- a valve body provided with a seat and at least one series of respective radial ducts disposed angularly spaced apart and opening into said seat;
- a rotary distributor disposed idly and in a fluid-tight manner within said seat, and provided with at least one through transverse bore and arranged selectively, depending on its angular position, to block off said radial ducts or to connect them together in pairs;
- a pair of linear electromagnetic actuators;
- transmission means mechanically connecting said electromagnetic actuators to said rotary distributor, said transmission means being arranged to convert, with a predetermined step-up ratio, the linear motion of said actuators into rotary motion of said distributor.

BRIEF DESCRIPTION OF THE DRAWINGS

The invention will be more apparent from the description of one embodiment thereof given hereinafter by way of non-limiting example with reference to the accompanying drawings in which:

FIG. 1 is a sectional elevation through a servovalve constructed in accordance with the present invention;

FIG. 2 is a section through the valve of FIG. 1 taken on the line 2—2 and

DETAILED DESCRIPTION OF THE INVENTION

Figure 3:
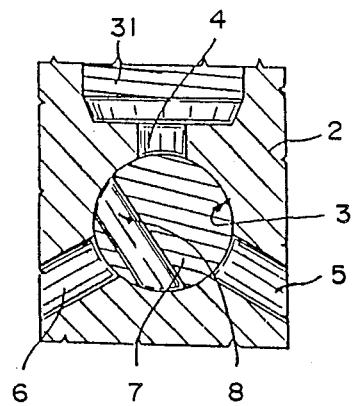
FIGS. 3, 4 and 5 are sections on the lines 3—3.

In FIGS. 1 and 2 the reference numeral 1 indicates overall a servovalve for controlling the flow rate of a fluid leaving and entering an actuator of any known type, not shown for simplicity, forming part for example of a known active suspension of a vehicle, also not shown for simplicity.

Figure 6:
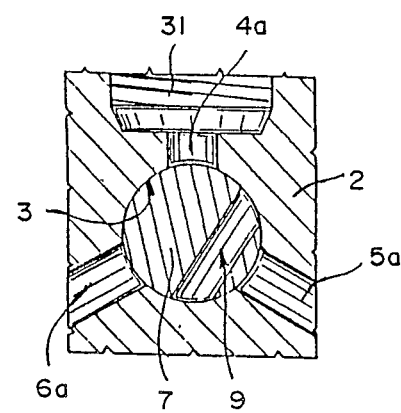
FIGS. 6, 7 and 8 are sections taken along line 4—4 respectively, showing the valve of FIGS. 1 and 2 in different operating positions.
Figure 5:
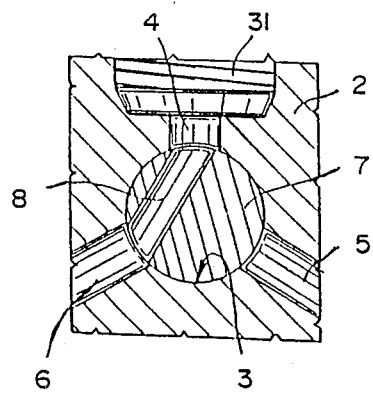
Figure 8:
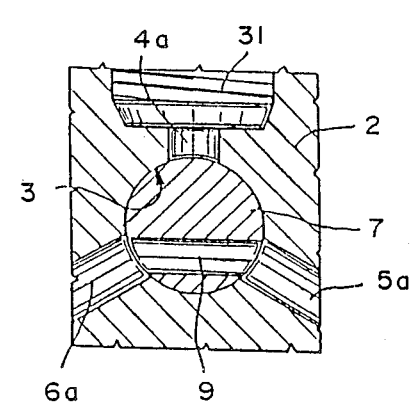

The servovalve 1 comprises a valve body 2 provided internally with a seat 3 and two series of respective radial ducts 4, 5, 6 and 4a, 5a, 6a, clearly shown in FIGS. 3 and 6 and disposed angularly spaced apart to open into the seat 3, and a rotary distributor 7 disposed idly and in a fluid-tight manner within the seat 3 and provided with a pair of transverse through bores indicated by 8 and 9 respectively, and arranged selectively, depending on its own angular position, to block off the radial ducts 4, 5, 6 and 4a, 5a, 6a or to connect them together in pairs. The servovalve 1 also comprises a pair of linear electromagnetic actuators 10 and 11 of substantially known type, and transmission means indicated overall by 12 and mechanically connecting the electromagnetic actuators 10 and 11 to the rotary distributor 7 to convert, with a predetermined step-up ratio, the linear motion of the actuators into rotary motion of the distributor 7. According to the invention, the transmission means 12 comprise a rocker system in which slide rods 14 connect the electromagnetic actuators 11 and 12 to opposite sides of a first control shaft 15, a second control shaft 16 connected angularly rigid with and coaxial to the rotary distributor 7 and projecting axially from one end 18 of the seat 3, an intermediate shaft 19 disposed parallel to the shafts 15 and 16, and a train of gears 20, 21, 22 and 23 fixed angularly rigid onto the shafts 15, 16 and 19 and mutually engaging in pairs. Specifically, the transmission means 12 are housed in a casing 25 carried rigidly by the valve body 2 at the end 18 of the seat 3, and the linear electromagnetic actuators 10 and 12 are mounted side by side parallel to each other within a housing 26 projecting transversely from the casing 25, and are disposed with their longitudinal axis substantially perpendicular to the axis of rotation of the rotary distributor 7. This is defined in the present example by a cylindrical drum housed idly in a cylindrical through bore in the valve body 2 and defining the seat 3, and projectingly carriers the control shaft 16 in an angularly rigid manner in a position corresponding with the end 18 of the seat 3. The end 18 and a corresponding opposite end 29 of the seat 3 are sealed by respective shoulder flanges 30 and 30a which axially lock the drum 7 with its transverse bores 8 and 9 disposed coplanar with the series of radial ducts 4, 5, 6 and with the series of radial ducts 4a, 5a, 6a respectively. These are positioned radially to the drum 7 at substantially 120° apart and are connected to four respective connectors 31 formed in the valve body 2, of which only one is shown for simplicity, and which are connectable in known manner for example to a pressurised oil source in the case of that shown, to an atmospheric pressure discharge line in the case of a further one, and the remaining two to the respective chambers of a known hydraulic actuator, not shown for simplicity, which the servovalve 1 is to operate. In accordance with a known scheme, the ducts 4, 4a are connected in common to the illustrated connector 31 for connection to the feed, the ducts 6a and 5 are connected in common to a connector 31 (not shown) which is connected to discharge, and the ducts 6 and 5a are each connected to one of the other non-illustrated connectors 31. The transverse bores 8 and 9 are formed obliquely to each other at a relative inclination of substantially 60°. In this manner the distributor when in a first position corresponding to that shown in FIGS. 3 and 6 maintains the ducts 4–4a, 5–5a and 6–6a blocked off in a fluid-tight manner and isolated from each other, whereas in a second position shown in FIGS. 5 and 8 and corresponding to an approximately 60° anticlockwise rotation from the preceding, it connects the duct 6 to the duct 5 and the duct 4a to the duct 5a by way of the bores 8 and 9 respectively, and in yet a third position shown in FIGS. 5 and 8 and symmetrical to the preceding, it connects the duct 6 to the duct 4 and the duct 6a to the duct 5a again by way of the bores 8 and 9 respectively.

According to the invention, the electromagnetic actuators 10 and 11 each comprise a solenoid 35 and an internally hollow mobile core 36 constructed of ferromagnetic material and mounted axially slidable within the respective solenoid 35 with axial clearance in both directions. The rods 14 are fork-shaped and are rigid with and project axially from the mobile cores 36, at those ends of these latter which face the casing 25. The rocker-type transmission between the rods 14, which project within the casing 25, and the shaft 15 is defined by the gear 20 which is angularly rigid with the shaft 15, which is carried idly by the casing 25 so that it projects into this latter, and is angularly connected to the rods 14 by respective transverse pins 37 rigid with respective free ends 39 of these latter. The pins 37 are disposed parallel to the shaft 15 and are engaged in respective radial slots 38 provided in diametrically opposite positions in the gear 20. This latter is connected to a counteracting spring able, when the actuators are de-energised, to retain it in a position in which its slots are coplanar in a plane perpendicular to the rods 14 and, in the present example, passing through the axis of the shaft 15 as shown in FIG. 2. This counteracting spring is in the form of an elastic rod 40 carried rigidly by the casing and projecting into its interior parallel and coplanar with the shaft 15 and having its free end 41 engaged in a hole 42 provided axially in the gear 20 in a position eccentric to the shaft 15 and angularly equidistant from the radial slots 38.

The gear 20 engages the gear 21, which is of smaller diameter and is fixed onto the shaft 19 to the side of the gear 22, which is angularly rigid with the gear 21 and is of larger diameter than this latter. The gear 22 engages a pinion 23 of smaller diameter than the gear 22 and fixed angularly rigid on the control shaft 16. In this manner, an angular rotation of a few degrees of the gear 20 is able to produce a much greater angular rotation of the distributor 7 in the same direction.

Figure 4:
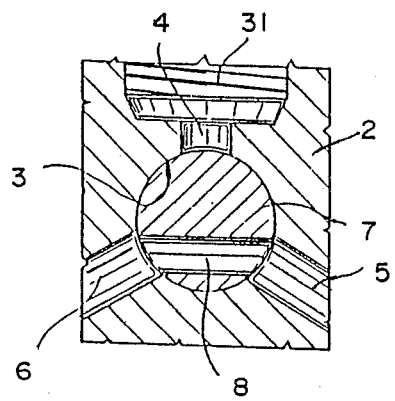
Figure 7:
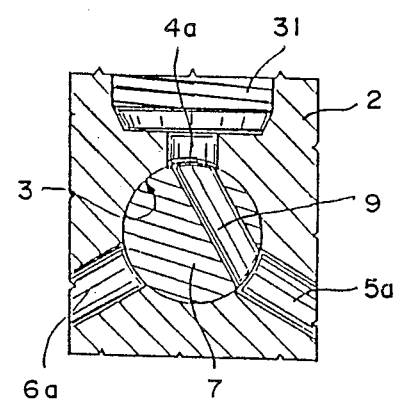

When in use, with the electromagnets 10 and 11 de-energised the servovalve 1 is in the position illustrated in FIGS. 1 and 2. The spring 40 retains the gear 20 with its slots 38 perpendicular to the rods 14, and consequently the distributor 7 is kept in its neutral angular position shown in FIGS. 3 and 6. When in this position the valve 1 locks the actuator which it controls. On energising the electromagnet 11 so that it attracts the core 36 into the solenoid 35, the rod 14 connected to it retracts to consequently rotate the gear 20 anticlockwise, so that the core of the de-energised electromagnet 10 emerges from its solenoid 35 and the rotation of the gear 20 is transmitted, with suitable step-up through the gear train 21, 22 and 23, to the distributor 7 which when the actuator 11 reaches its end of travel assumes the angular position shown in FIGS. 4 and 7, to connect one of the actuator chambers to discharge (through the ducts 6 and 5) and the other to the feed (through the ducts 4a and 5a). As soon as energisation of the electromagnet 11 ceases, the spring 40, which has been elastically deformed by the rotation of the gear 20, is no longer counteracted and returns the gear 20 to its initial position, consequently also returning the distributor 7 and rods 14 into this position. When instead the electromagnet 10 is energised, a new rotation of the distributor 7 is produced in the described manner, but in the clockwise direction, so that it attains the position shown in FIGS. 5 and 8 when the electromagnet 10 reaches its end of travel, in which the feed and discharge connections to the actuator chambers are reversed about the symmetrical position.

We claim:

1. An electromagnetically operated servovalve in particular for controlling an actuator in an active vehicle suspension, characterized by comprising in combination:
   (a) a valve body provided with a seat and at least one series of respective radial ducts disposed angularly spaced apart and opening into said seat;
   (b) a rotary distributor disposed idly and in a fluid-tight manner within said seat, and provided with at least one through transverse bore and arranged selectively, depending on its angular position, to block off said radial ducts or to connect them together in pairs;
   (c) a pair of linear electromagnetic actuators;
   (d) transmission means mechanically connecting said electromagnetic actuators to said rotary distributor, said transmission means being arranged to convert, with a pre-determined step-up ratio, the linear motion of said actuators into rotary motion of said distributor,
   (e) said linear electromagnetic actuators are disposed side-by-side and parallel, perpendicular to the axis of rotation of said rotary distributor and each comprises a solenoid and an internally hollow core mounted axially slidable within the respective solenoid; and
   (f) said transmission means comprise a rocker system in which slide rods connect said electromagnetic actuators to opposite sides of a first control shaft, a second control shaft connected angularly rigid with and coaxial to said rotary distributor and projecting axially from one end of said seat, an intermediate shaft disposed parallel to said first and second control shaft, and a train of gears fixed angularly rigid onto said shafts and mutually engaging in pairs.

2. A servovalve as claimed in claim 1, characterized in that said rods are fork-shaped and are carried rigidly by and project axially from said mobile cores of the electromagnetic actuators, said rods being angularly connected to a first gear, fixed onto said first control shaft, by respective transverse pins which are parallel to said first control shaft and are engaged in respective radial slots provided in diametrically opposite positions in said first gear.

3. A servovalve as claimed in claim 2, characterized in that said first gear is connected to a counteracting spring which when the actuators are de-energised retains it with said slots disposed coplanar in a plane perpendicular to said rods.

4. A servovalve as claimed in claim 3, characterized in that said counteracting spring is in the form of an elastic rod projecting parallel to said first control shaft and having its free end engaged in a hole provided in said first gear in a position eccentric to said first control shaft and angularly equidistant from said radial slots.

5. A servovalve as claimed in claim 4, characterized in that said first gear engages a second smaller-diameter gear fixed on said intermediate shaft in a manner angularly rigid with a third gear of larger diameter than the second and engaging a fourth gear of lesser diameter than the third gear and fixed angularly rigid on said second control shaft; this latter being disposed coaxial to said first control shaft.

6. A servovalve as claimed in claim 1, characterized in that said transmission means are housed in a casing which is carried rigidly by said valve body at one end of said seat and itself transversely carries a projecting housing for said electromagnetic actuators.

7. A servovalve as claimed in claim 1, characterized in that said rotary distributor is defined by a cylindrical drum housed idly in a cylindrical through bore in said valve body and defining said seat, and is sealed at its opposing ends by respective shoulder flanges; said drum being provided with a pair of side-by-side through oblique bores inclined by substantially 60° to each other, said bores being disposed coplanar with two respective series each of three ducts provided radially to the drum at substantially 120° apart; said ducts being connected to respective connectors on said valve body.

* * * * *